(12) United States Patent
Holway

(10) Patent No.: US 6,293,676 B1
(45) Date of Patent: *Sep. 25, 2001

(54) CAMERA SUPPORT INCLUDING EXTENDABLE POST

(75) Inventor: Jerry Holway, Exton, PA (US)

(73) Assignee: Garrett W. Brown, Philadelphia, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,598

(22) Filed: Feb. 17, 1999

Related U.S. Application Data

(60) Provisional application No. 60/074,877, filed on Feb. 17, 1998.

(51) Int. Cl.[7] ................................................. G03B 17/00
(52) U.S. Cl. ........................... 352/243; 396/421; 396/428
(58) Field of Search ............................... 352/183, 63, 34, 352/85, 131, 176, 197, 232, 242; 396/419, 421, 428; 348/373; 248/183.1, 637, 183; 343/901; D16/242; 84/376 A; 211/115; 362/148

(56) References Cited

U.S. PATENT DOCUMENTS

| | | |
|---|---|---|
| D. 358,832 * 5/1995 | Lenny | D16/242 |
| 473,357 4/1892 | Servus | 248/155 |
| 1,463,446 * 7/1923 | Snowden | 396/42 |
| 1,686,678 10/1928 | Burke | 267/74 |
| 2,053,226 9/1936 | Ruge | 52/113 |
| 2,143,649 1/1939 | Dansard | 174/69 |
| 2,481,717 9/1949 | Blair | 248/183.2 |
| 2,580,120 * 12/1951 | Mooney | 84/376 A |
| 2,939,144 * 5/1960 | Havnosky | 343/901 |
| 3,371,589 3/1968 | Whittlesey | 396/428 |
| 4,017,168 * 4/1977 | Brown | 352/243 |
| 4,158,490 * 6/1979 | Gottschalk | 352/243 |
| 4,196,881 4/1980 | Davidson | 248/157 |
| 4,474,439 10/1984 | Brown | 352/243 |
| 4,657,267 4/1987 | Jaumann et al. | 280/47.11 |
| 5,490,655 2/1996 | Bates | 248/329 |
| 5,579,071 * 11/1996 | Wetzel | 396/428 |
| 5,752,112 * 5/1998 | Paddock | 396/421 |

* cited by examiner

Primary Examiner—Russell Adams
Assistant Examiner—Roy Fuller
(74) Attorney, Agent, or Firm—Schnader Harrison Segal & Lewis LLP

(57) ABSTRACT

For extended long-post operation of a Steadicam®-type camera stabilizer while retaining static and dynamic balance throughout the entire range of post sizes and various component weights, the present invention is directed to an arrangement of telescoping posts, component positioning hardware, electrical wire retracting hardware, and optional hardware to augment rigidity.

60 Claims, 12 Drawing Sheets

RETRACT WITHIN A TELESCOPING TUBE
WITH MINIMUM WEIGHT
STEP 1
STEP 2
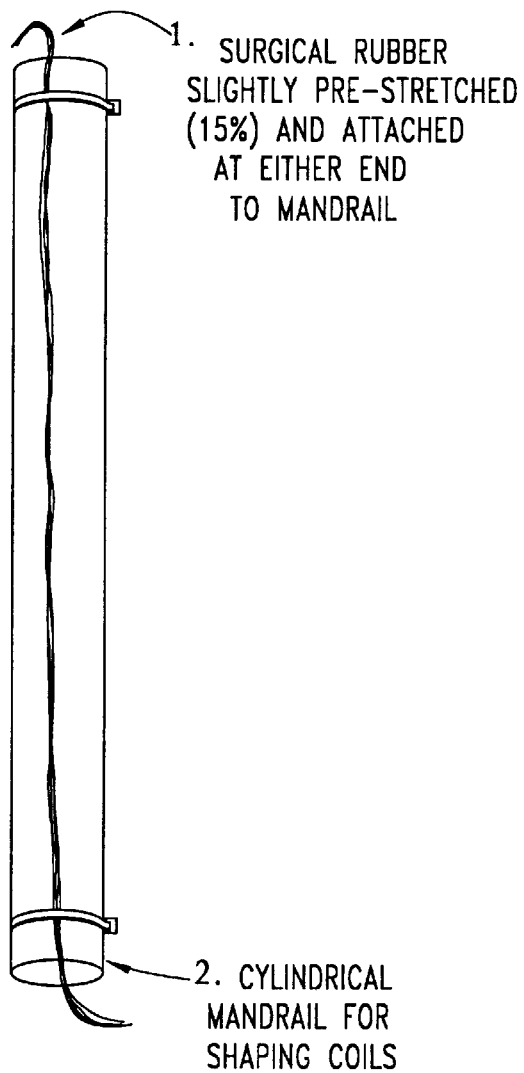
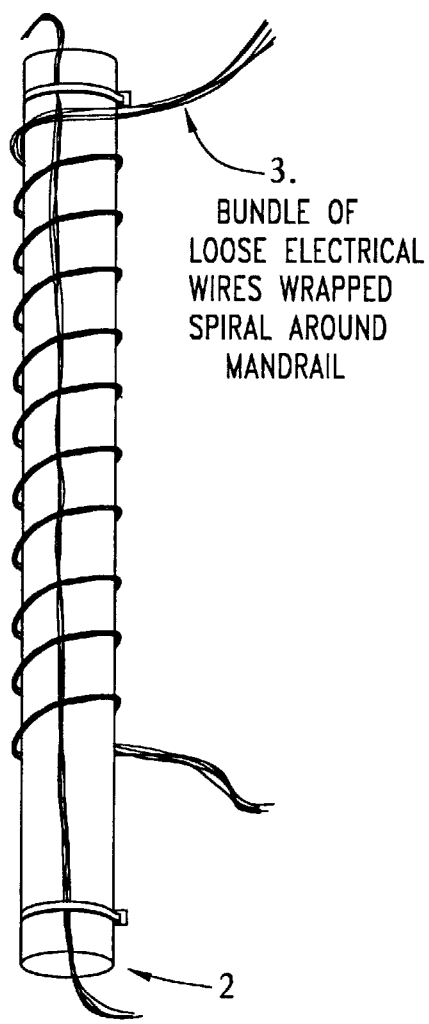
1. SURGICAL RUBBER SLIGHTLY PRE-STRETCHED (15%) AND ATTACHED AT EITHER END TO MANDRAIL
2. CYLINDRICAL MANDRAIL FOR SHAPING COILS
3. BUNDLE OF LOOSE ELECTRICAL WIRES WRAPPED SPIRAL AROUND MANDRAIL
FIG. 11A
FIG. 11B

CAMERA SUPPORT INCLUDING EXTENDABLE POST

CROSS-REFERENCE TO RELATED APPLICATIONS

This application claims the benefit of the filing date of U.S. provisional application No. 60/074,877, filed on Feb. 17, 1998.

BACKGROUND OF THE INVENTION

The Steadicam® camera stabilizer has become a mainstay of the motion picture and video industries (see U.S. Pat. Nos. Re. 32,213; 4,017,168; 4,156,512; 4,208,028; 4,474,439; 5,360,196; 5,435,515; and 5,579,071, the teachings of which are incorporated herein by reference). The camera stabilizer comprises an expanded camera support (i.e., the "sled"), an operator vest, and an articulated equipoising arm that is attached between the vest and a three-axis gimbal on the camera support. The Steadicam® camera stabilizer permits a camera operator (carrying a camera) to walk, run, climb stairs, etc., while maintaining a stable image. It received an Oscar for Scientific/Technical Achievement in 1978. In the intervening years, a number of problems and new opportunities have been identified, which have not yet been resolved or facilitated by existing Steadicam® equipment.

Since 1979, operators have routinely operated the Steadicam® camera stabilizer with the sled inverted, so that the camera is on the bottom and the battery, monitor, etc., are on top. This maneuver facilitates "low-mode" operation which allows the camera lens height to be anywhere between the waist and the knees of the operator. However, it is frequently desirable to have the lens much lower. And in normal "high-mode" operating, with the camera on top, it is frequently desirable to have the lens considerably above the operator's head. Since 1985, to facilitate both of these objectives, operators have fashioned extra-long 72-inch "super-posts" to replace the normal-sized main post of the conventional Steadicam® camera stabilizer. The use of an extra-long post allows for lens heights in low-mode right down to the ground, and, in high-mode, up to nearly 8 feet in the air.

The problem with this arrangement is the time it takes to switch over from the conventional Steadicam® camera stabilizer configuration, and the cost of the components that are owned in duplicate in order to prevent even more time-consuming operations. All super-post designs presently offered to operators require 20 or more minutes to install, even if the operator owns an extra gimbal and even a extra "stage" (i.e., the adjustable mounting platform for use in attaching and positioning various cameras).

In order to make this changeover, operators must presently disconnect and remove the camera, disassemble the sled, reassemble, re-install, reconnect, etc., and the result is that operators and their clients dread the time taken to change over to (and back from) ultra high-mode or ultra low-mode shooting. Furthermore, operators must frequently spend fifteen thousand dollars or more in order to carry the extra equipment required to prevent even further waste of time.

Note that it is impractical to maintain the Steadicam® camera stabilizer, in the "super-post" mode all the time for two reasons: The Steadicam® camera stabilizer is easier to operate, particularly for rapid moves in close quarters, when it is in its compact normal mode. For routine shooting in this normal mode, the rotational inertia of the sled in the tilt axis is more closely matched to its inertia in the pan axis, which makes it easier to use. Also, because of its enormous length, the "super-post" mode makes it impossible to achieve the most common range of lens heights, which are between the knees and head of the operator.

A further difficulty with existing super-post designs is that even the stiffest carbon-fiber post designs are prone to vibration and "whipping" during high-speed running, violent maneuvers, or shots made while riding in bumpy vehicles.

Problems have also arisen with existing super-post designs, because, with light cameras and corresponding lower gimbal positions (the gimbal needs to be at the center of gravity), the range of monitor positions providing an acceptable line of sight for the operator is severely restricted.

There is another mode of shooting that has always been problematic. A number of operators also own and supply a "running" rig which consists of a dedicated "sled" with a lightweight monitor and battery, so that it will appropriately counterbalance the lightest available camera to facilitate running shots at top speed. These kinds of shots can be dangerous when carrying the 70+ pounds of the conventional Steadicam® rig with all accessories. If an operator owns duplicates of all the necessary components, he or she can have a lightweight running rig standing by for nearly immediate use. However, according to today's most common usage, a large number of ancillary components must also be duplicated and mounted for this purpose, such as a remote video transmitter so the director can watch the shot in progress, and additional wireless focus-pulling equipment so that the camera assistant can adjust the focus of the lens. Therefore, an operator must either be resigned to spending a lot of time or a lot of money in order to provide this running rig to his clients.

U.S. Pat. No. 5,579,071 discloses the sled of what is marketed as the "Master Series" Steadicam® camera stabilizer. It provides for quick changeovers, such as low-mode, and for other common adjustments without the use of tools, by providing special finger-operated clamps and locking knobs. With the Master Series sled, an operator can change over to low-mode in seconds-an operation that formerly used to take 10 minutes or more—and can adjust the bottom-heaviness of the sled by moving the gimbal/handle assembly up or down on the post in just a second or two. This "no-tools" philosophy is applied to every operation on the Master Series equipment, including adjustment of the lifting strength of the arm and of the fit of the vest.

Like most Steadicam rigs, the Master Series rig comes with an expandable post, but its range is severely limited because of the need for the sled to be at a normal size for most shooting. Therefore, even at maximum expansion, the post only lowers or raises the range of lens heights available to the operator by a few inches.

The Master Series equipment provides for increasing and decreasing the rotational inertia of the sled by spreading out the principal masses—by pulling the monitor forward and the battery rearward. This is a useful feature, but constraints of the present configuration of the sled mean that the amount of travel of monitor and battery is quite limited.

Available Steadicam® designs do not provide for independent tilting of the camera. As a result, operators have long endured a number of consequences: In 90% of operating situations, lens heights are maintained above the waist level of actors, and therefore the Steadicam® is normally carried with a slight (3° to 5°) down tilt to accomplish proper framing and "headroom". This has required the whole "sled" (the entire camera support structure) to be tilted, causing a number of problems. Steadicam® sleds are carefully adjusted to be in dynamic balance so that when panned, they spin around the true axis of the central post without precession. This becomes meaningless and counterproductive, when the sled centerpost is not held vertical, since panning now requires this axis to artificially precess around true vertical. In addition, maintaining this perpetual tilt frequently causes physical interference when operators "switch" the equipment from one side of the body to the other, since such a move is more likely to be obstructed by the Steadicam® arm hardware when the sled is tilted down and its lower components are therefore displaced to the rear.

In other cases, more radical tilts up and down have always required correspondingly radical tilts of the entire sled, particularly with long-post operation. Such radical tilts mean that the height of the camera enabled by the long post is immediately reduced because of its arcuate swing forward when the entire long sled is tilted. Of course this also exacerbates the clearance problems encountered when moving through tilt quarters on a set because the post now sticks out considerably, both in front of and behind the operator.

One reason that tilting heads have not been devised previously for Steadicam® is that use of known designs would tend to cause additional problems. The functioning, for example, of conventional tripod-head-type tilt mechanisms would cause violent changes in the position of the camera's center of gravity, thus requiring elaborate rebalancing. Even the use of known special tripod-head designs that rotate about a point directly above their mounting centerline would unacceptably shift the camera's center of gravity (c.g.) when functioned, since in Steadicam® applications, dynamic balance usually requires that the camera's c.g. be nominally one inch aft from the centerline of the main Steadicam® post. Also, such designs, insofar as is known, would all require excessive size and weight in order to provide for as much as 20° of tilt up and down. Their excessive depth would restrict the range of gimbal positions near the top of the post which are employed to balance the heavier cameras. Also, such conventional tilt heads would obstruct access to any clamps or hardware positioned high on the post just below the camera.

Another problem, even with previous small telescoping posts is getting the internal electrical wires to retract without fouling when the posts are fully shortened.

OBJECTS OF THE INVENTION

An object of the present invention is to provide a "superpost" mechanism that is capable of collapsing to fit within the height of a normal-sized sled, yet which can expand to a full 72-inch length, and do so within a few seconds without tools and without the need to own any duplicate hardware.

It is also an object of the present invention that the rotational inertia of the sled in the pan axis can be greatly increased so that even when the post is fully extended, the pan inertia is at least similar in magnitude to that of the tilt inertia.

It is also an object of the present invention that the sled be equipped to protect against vibration and whipping caused by violent operation while fully extended to its maximum height.

It is also an object of the present invention that the sled provides for near instant changeover to a light monitor and battery for "running " rig operation, while providing that all accessories remain aboard, and a minimum of duplicate hardware is required.

It is also object of the present invention that all other adjustments—including re-balancing and re-adjustment of the new gimbal position—are still accomplished according the "no-tools, instantly-adjustable" philosophy of the Master Series equipment.

It is also an object of the present invention to provide a novel structure for a telescoping post, with means for appropriate gimbal placement and positioning of counterbalancing masses so that it can be statically and dynamically balanced with any combination of post length and selected camera, monitor, and battery weights; and still provide a useable monitor viewing position.

It is also an object of the present invention to provide a tilting head attached between the camera and the centerpost to independently tilt the camera from the orientation of the centerpost, in order to help maintain dynamic balance when the Steadicam® pans around the vertical axis of the said centerpost, with the lens axis at an angle other than horizontal.

It is a further object of the invention to provide a tilting head to independently tilt the camera from the orientation of the centerpost in order to avoid clearance problems and lens height variations caused by tilting the entire Steadicam® sled.

It is also an object of the invention to provide a practical and novel camera tilting head between the camera and the centerpost support, which is small and compact, and which, when functioned, does not cause an unacceptable shift in the camera's c.g. and does not obstruct the region of the top of the said post, so that both normal and extended-post operation can be accomplished with the said post maintained more closely in a vertical position.

It is a further object of the invention to provide a novel method and device to permit the retraction of internal electrical wiring without fouling even when the oversized telescoping is fully shortened.

DETAILED DESCRIPTION OF PREFERRED EMBODIMENT

A preferred embodiment comprises a novel structure for a telescoping post as follows: A main section adapted to provide an unobstructed range of positions for gimbal and monitor bracket placement, at least one additional telescoping section of lesser diameter between this main section and the camera mounting, and at least another additional telescoping section between the main section and the mounting for the counterbalancing equipment, such as the battery. The telescoping post includes monitor and battery mountings adapted to be positioned at varying perpendicular distances from the post. The structure is therefore adapted to be balanced statically and dynamically throughout the entire range of possible post lengths, and with any combination of selected camera, monitor, and/or battery weights. As used herein the term camera refers to any sensing or imaging device or any means for capturing an image or information. As used herein the monitor refers to any viewable display, viewing means, or any other counterbalancing element. As used herein the battery refers to any counterbalancing mass.

This lateral positioning of the monitor and battery is preferably accomplished with mounting rods extending from clamps fixed to one or more of the tubes, which also therefore provides control over the magnitude of the rotational inertia of the sled in the pan axis.

Referring further to the portion of the post assembly between the main post and the battery (counterbalancing equipment), a preferred embodiment comprises two additional annular posts of increasing diameter, both larger than the main post, and positioned between the main post and the counterbalancing equipment. The first of these posts is preferably adapted for the mounting of the monitor assembly. The outermost and largest of these posts is adapted for the mounting of the counterbalancing equipment such as the battery. In this preferred embodiment, each of the four total posts is adapted for the mounting of one part of the equipment, such as follows: The smallest diameter (topmost) post holds the camera supporting stage. The next larger diameter "main" post holds the gimbal mount. The third largest annular post holds the monitor support, and the largest post holds the battery and other counterbalancing equipment. This arrangement provides the maximum flexibility of positioning for the various components in order to appropriately counterbalance the broadest range of camera weights. Neither of the two largest additional posts is longer than approximately half the length of the main post, so that sufficient room for a range of gimbal positions still remains above the posts (and associated equipment) during fully collapsed "normal" operating.

This arrangement also provides maximum flexibility of positioning for other purposes including monitor viewing, lens height, clearance to avoid obstruction, and similar.

Another preferred embodiment comprises a single additional telescoping post of lesser diameter than the main post, between the main post and the battery mounting. In this embodiment, the battery is mounted to an annular partial cylinder of greater diameter than the main post. This partial cylinder is adapted for mounting of the battery and the counterbalancing equipment. The cylinder is attached to the base of the inner post, and it is "partial" because it is notched for access to the locking clamp for the inner post. This partial cylinder telescopes over the main post when the inner post is fully collapsed. This partial cylinder should also preferably not exceed half the length of the main post, in order to provide a range of appropriate gimbal positions to balance the sled during "collapsed" or normal operation.

Prevailing expert operation of the Steadicam® camera stabilizer generally requires that the gimbal be positioned approximately at the center of gravity of the entire sled. Both of the above preferred embodiments provide that, even with a light camera and heavy monitor and battery, there will be sufficient room on the main post for an acceptable range of gimbal and monitor positions to facilitate operating and viewing, respectively.

Dampening of the vibration inherent in energetic "superpost" operation or as experienced during violent vehicle shooting or highspeed running situations (even with normal post lengths) is provided by the deployment of a plurality of stays or "shrouds" consisting of tensioning wires or non-stretch lines passing over add-on spreaders or other mounting points such as hooks attached to points such as the monitor equipment or battery equipment which points are appropriately displaced from the centerline of the main post. The shrouds are adapted to function at any post length to stiffen the post unidirectionally along each of a plurality of approximately perpendicular axes. Spreaders can be attached to an add-on clamp on the main post, or to the monitor hardware and the shrouds can be deployed between attachment means up close to the camera and near the base of the lower post. The shrouds are deployed over the said spreader means and tensioned, preferably, by extending one of the telescoping post sections to slightly stress the column of the post, or by pulling tight one end of a single length of non-stretch line (such as Spectra®), which has been continuously threaded bidirectionally from, by way of example, a point near the top of the battery, down to and under an attachment point at the base of the post system, up and over one of the "spreader" points (either extending from the post, or attached to the monitor equipment), and on up and over an attachment point near the camera mount; and then back down via a different spreader point (displaced from the first, to provide another direction of stiffening) and continuing down under an attachment at the bottom of the post, and up to the top of the battery for final tensioning and attachment by conventional means. This will cure the normal magnitude of vibrations. Although this system would seem not to add stiffness against a sudden vibration of the gimbal toward an anterior direction, in usual operation, the centerpost is pre-stressed and slightly bowed by the shrouds in the direction of the spreaders employed, and therefore resists this anterior vibration up to a magnitude that would exceed the degree of this pre-stressing. Depending on the violence of the shot, and whether the operator's position remains constant relative to the sled, it is possible to add a third spreader and additional shroud. These stiffening shrouds permit the use of extremely lightweight carbon fiber post sections. Otherwise, the posts would have to be heavier and perhaps of larger diameter in order to be sufficiently rigid.

Preferably, between the camera mounting stage and the main support post, a tilting-head is provided to permit changing the tilt attitude of the camera independent of the typically vertical angle of the centerpost. In a preferred embodiment, this tilt head is arranged to provide the lowest possible vertical profile and the least obstruction to the hardware at the top of the post consistent with the ability to tilt the camera approximately 20° up and down with reference to the said post. Preferably this tilt head comprises sleeves attached to, and flanking, the top of the centerpost with through-bolts to which a symmetrical arrangement of arcuate slots can be slidably positioned and clamped—said arcuate slots being cut into a plurality of opposed rigid arcs depending from the camera mount. As used herein, the term slot refers to an opening or any position registering surface or means for securably adjusting angular position or registration.

Preferably the said slots are concentric to a point in space coincident with the mean center of gravity of the range of cameras appropriate to Steadicam® use—which point is typically displaced rearward from the centerline of the mounting post in order to preserve dynamic balance. Preferably, there are two sets of paired laterally symmetrical arcuate slots, of differing radii such that each sleeved bolt engages its own pair of slots, with the rearward sleeved bolt engaging the slots of the smallest radius, thus providing additional vertical clearance for functioning components associated with the upper anterior surface of the centerpost. In addition, preferably, the arcuate slots extend a short distance at the forward end in a non-arcuate direction, adapted to allow continued tilting by substituting a small vertical shift in the camera's c.g., but preserving its lateral position, thus allowing additional tilt in the direction which would otherwise be more readily obstructed because the said preferable center of tilt rotation is to the rear of the centerline of the centerpost.

In one embodiment, the invention is a telescoping post for a Steadicam®-type camera stabilizing camera support comprising: (a) a first section adapted to provide a range of positions for clamping a gimbal assembly, and for clamping a monitor or other equipment; (b) a second telescoping post of lesser diameter extending to a camera support assembly; (c) a third telescoping post extending in the opposite direction to the assembly for mounting counterbalancing equipment (e.g., a battery); (d) extending means to adjustably position the monitor in and out along a line roughly perpendicular to the main post; (e) extending means to adjustably position the battery in and out from an additional post; and (f) removable shroud and spreader means to dampen vibration when post is fully extended.

The present invention includes a novel method and device for retracting electrical wires running within the oversized telescoping posts when they are fully shortened. A preferred embodiment provides a spiral coil of said wires with each turn attached at the point where it crosses a length of surgical rubber run up the inside of and parallel to the axis of the said coil. The method of accomplishing this is to slightly prestretch and attach it lengthwise along a mandril of suitable size to wind a coil which will fit into the smallest of the said telescoping posts. A loose bundle of wires can then be wrapped around the said mandril in a spiral coil, passing over the said surgical rubber. Each turn of this coil is then attached by means of, for example, "Zipties" to the surgical rubber at each point where they cross. The mandril is then removed, and the resulting coil exhibits the properties of a "curlycord", but without the diameter and excess weight of the "curly" jacket.

BRIEF DESCRIPTION OF THE DRAWINGS

FIG. 11 is a diagram of step one and step two of the method for fabricating the ultralight curlycord employed for retracting the internal electrical wires within the telescoping posts without fouling.

DETAILED DESCRIPTION OF THE DRAWINGS

Figure 1:
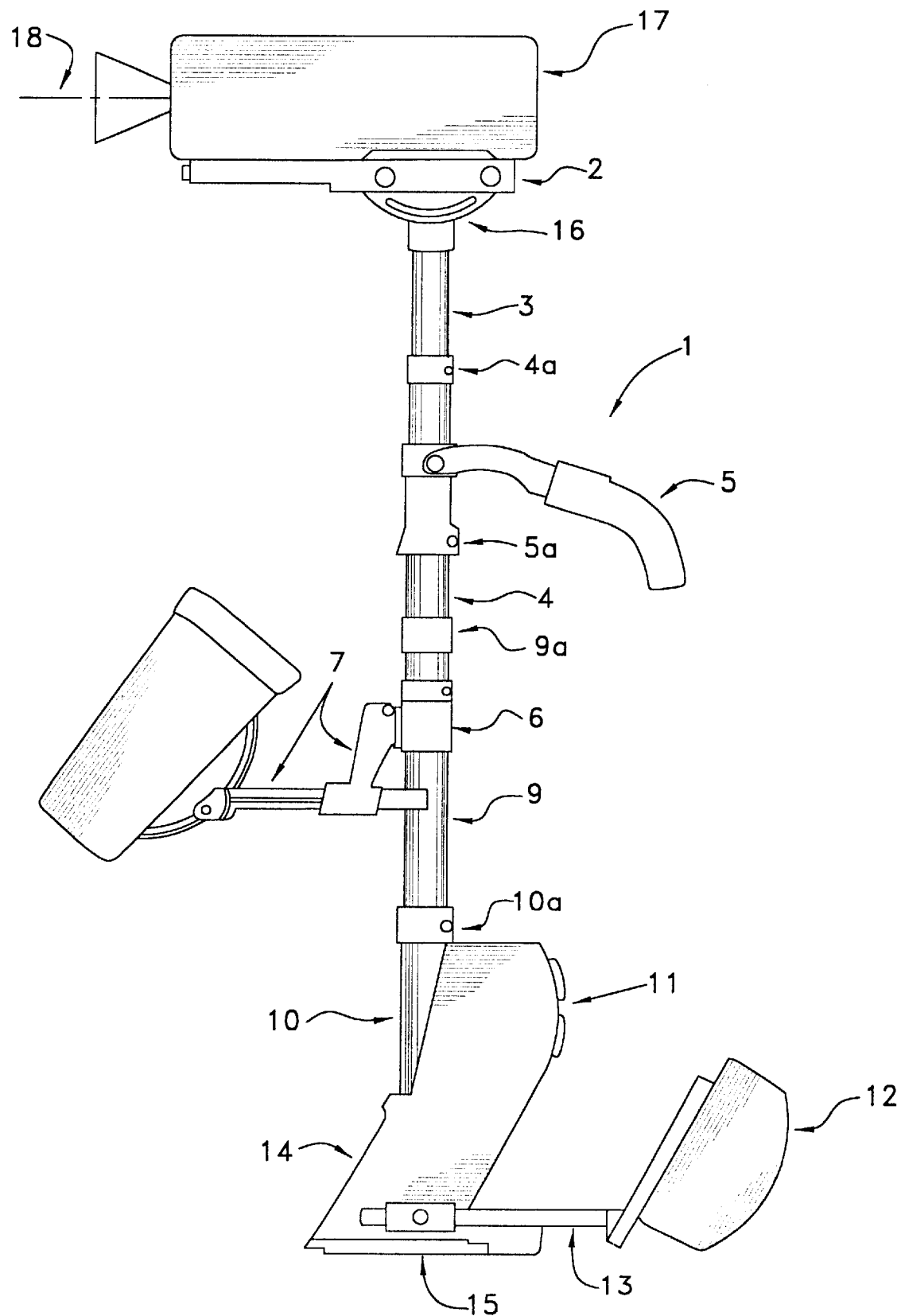
FIG. 1 is an elevational view showing a preferred embodiment, the invention is a telescoping post for a Steadicam®-type camera stabilizing support comprising:
(a.) a first section adapted to provide a range of positions for clamping a gimbal assembly and for optionally clamping a monitor or other equipment;
(b) A second telescoping post of lesser diameter extending to a camera support assembly;
preferably with a tilting head between post and camera assembly;
(c) a third annular telescoping post of larger diameter than the first section extending in the opposite direction to the camera assembly for preferably mounting monitor supporting equipment;
(d) extending means to adjustably position the monitor in and out along a line roughly perpendicular to the main post; and
(e.) preferably a fourth (largest) annular post for mounting counterbalancing equipment such as a battery, including extending means to adjustably position the said battery in and out perpendicularly from the said additional post.

FIG. 1 shows a preferred embodiment of the present invention I with its telescoping posts 3, 4, 9, and 10 fully expanded. Stage 2 for mounting camera 17 is of conventional design, but it is preferably separated from post 3 by tilting head 16 which allows independent angular displacement of the camera 17 relative to the post 3 around an axis perpendicular to post 3 and also perpendicular to the lens axis 18 (herein referred to as "tilt"). Post 3 is a telescoping post between the main post 4 and the camera mounting 2 which post is of the smallest diameter of the assembly of telescoping posts.. "Main" post 4 is of the next larger diameter and is preferably employed for the mounting of gimbal/handle 5 (of conventional design), which is clamped at the desired position along post 4 by clamp 5a. Clamp 4a is of conventional design and locks post 3 to post 4 at any desired degree of extension. Post 9 is an additional telescoping post of the next to largest diameter between the main post 4 and the equipment mounting post 10, which preferably holds monitor mounting bracket 6. Said bracket has clamps to hold extending mounting posts 7 for the monitor, which provide adjustable in/out monitor positioning along an axis perpendicular to post 9. Video monitor 8 includes mounting hardware of conventional design for engaging extending posts 7. Clamp 9a locks the selected degree of extension of post 9 relative to the main post.

Final telescoping post 10, of the largest diameter of the four posts, is employed for mounting counterbalancing equipment 11, 14 and the battery mounting 12, and is clamped to post 9 by clamp 10a.

Electronics unit 11 is part of the counterbalancing equipment 14 attached to post 10. Battery and battery mounting 12 are of conventional design and are attached to extending rods 13, which provide adjustable in/out battery positioning along an axis perpendicular to post 10, and are attached to post 10 by clamps 15.

The present invention permits the maximum flexibility of Steadicam® operation. When all four posts 3,4,9, 10 are nested within each other, the assembly 1 is at it minimum height, and all components including monitor 8, gimbal 5 and counterbalancing hardware 11,12,14 are at their optimum positions relative to the useable range of weights of camera 17 so that the gimbal 5 can be placed approximately at the overall center of gravity of assembly 1. As the posts are extended to achieve higher lens heights (or lower lens heights in so-called "low-mode" operating), the operator can select the order and magnitude of post extensions in order to preserve the correct gimbal position. In addition, the operator can extend the monitor 8 and battery 12 further apart from the post assembly in order to increase the "pan"-inertia of the entire assembly 1, so that it more closely resembles the magnitude of the inertia felt when tilting the entire lengthened assembly 1. It has been found useful, even in ordinary operating with conventional post lengths, to have control over the pan-inertia of the sled. Shots involving quick panning motions are facilitated by keeping masses such as monitor 8 and battery 12 closer together, and the resulting smaller radius of rotation provides lower rotational inertia. Slow moving shots or those that don't involve panning are made much more inert, and therefore stable, in the pan axis by pulling the monitor and battery apart. The present invention provides for unprecedented separation distances between these components (and respectively from the centerline of the post), which therefore yields a mathematical increase in the pan-inertia by the square of the lengthened radius of rotation "Panning" a camera, even one that is tilted so that its lens axis is not horizontal, according to common practice in the TV and Motion Picture industries, almost always means rotating the said camera around an axis that is vertical. The present invention permits a Steadicam® operator to pre-tilt camera 17 by functioning the tilt-head 16 to achieve a lens axis 18 that is other than perpendicular to the post assembly. This helps preserve the verticality of the said post axis and therefore facilitates panning the Steadicam® around the said vertical axis without fighting the precession forces that previously have always accompanied operators' attempts to pan a tilted Steadicam®. Although Steadicam®s have been adjusted for years to be in dynamic balance, it has always, insofar as is known, been accomplished with reference to a vertical post, and therefore has only been a useful practice when panning a truly horizontal lens axis around the said true vertical axis.

"Pre-tilting" the tilting head 16 is also useful to at least partially obviate the clearance problems associated with a tilted post, since this reduces the degree to which the said tilted post sticks out ahead of or behind the operator. Pre-tilting also can help preserve the overall lens height achieved by the extended post assembly, which would be otherwise progressively reduced as the post departs from vertical.

Figure 2:
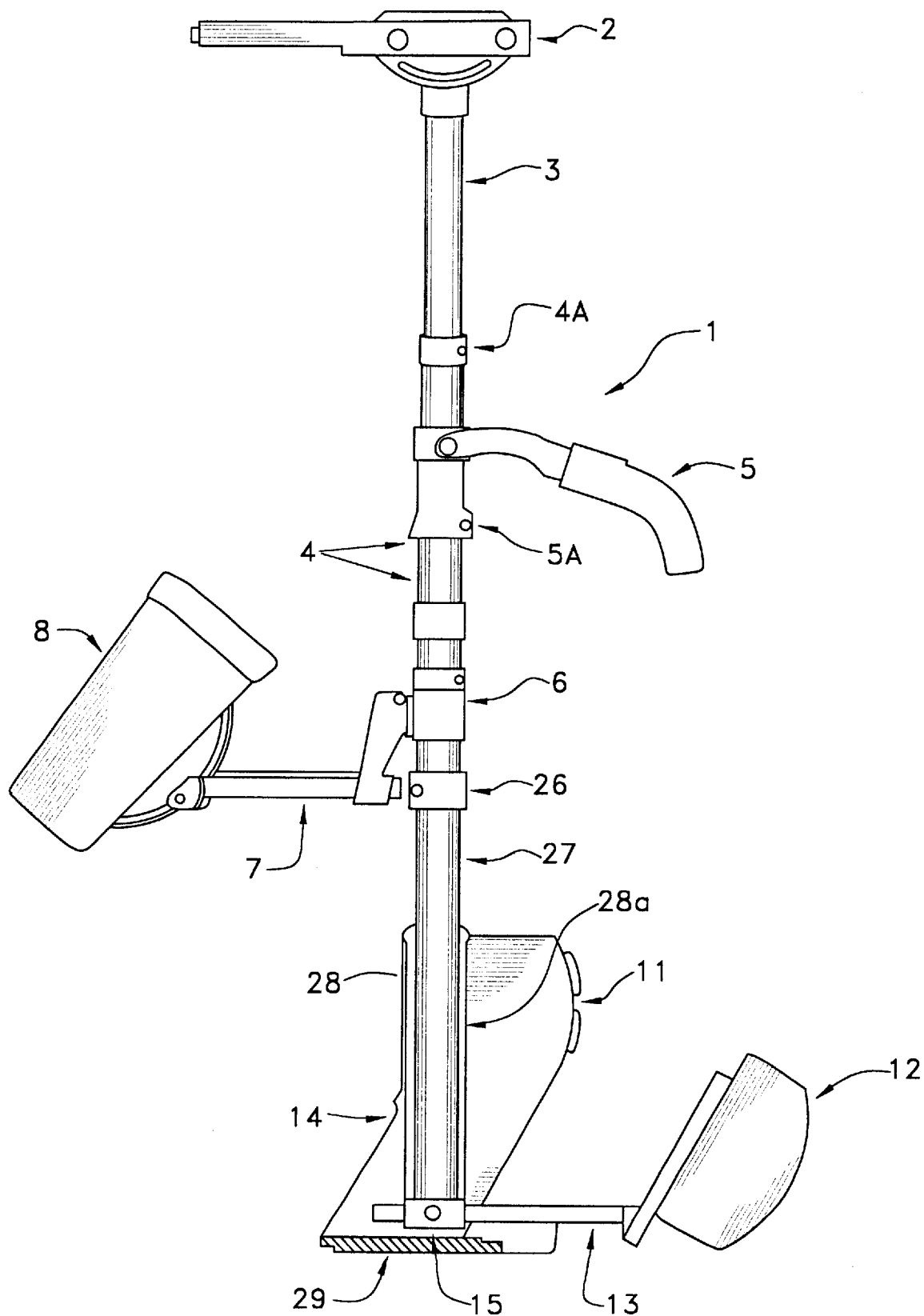
FIG. 2. is an elevational view of another embodiment comprising:
(a) a first section adapted to provide a range of positions for clamping a gimbal assembly, and for clamping a monitor or other equipment;
(b) a second telescoping post of lesser diameter extending to a camera support assembly;
(c) a third telescoping post of even smaller diameter that the second, extending downward from the main post and enabling the maximum possible total expansion of the battery-to-camera distance;
(d) a unshaped annular channel for holding additional counterbalancing equipment such as the battery attached to the bottom of this third post, and providing access to the clamping hardware for the said third post via its open slot.

FIG. 2 shows an elevation of another preferred embodiment of the invention in which the extended post assembly consists of camera mounting stage 2 attached to post 3, which is the second-largest of the three posts in this embodiment. Post 4 has the largest diameter and holds the gimbal and gimbal clamp 5, 5a, and the monitor 8 and its mounting equipment 6,7, and is clamped to post 3 by clamp 4a and to post 27 by clamp 26. Post 27 has the smallest diameter of the three posts, and telescopes from inside the other two toward the counterbalancing equipment 11, 14 and battery equipment 12, 13, 15. Said counterbalancing equipment is, in this embodiment, mounted to partial cylinder 28 which is itself attached to base 29 in a conventional manner. Base 29 is also attached to the bottom of post 27, so that when the posts 3 and 27 are collapsed within post four, this assembly is overlapped by partial cylinder 28, and its integral slot 28a provides access to clamp 16.

Figure 3:
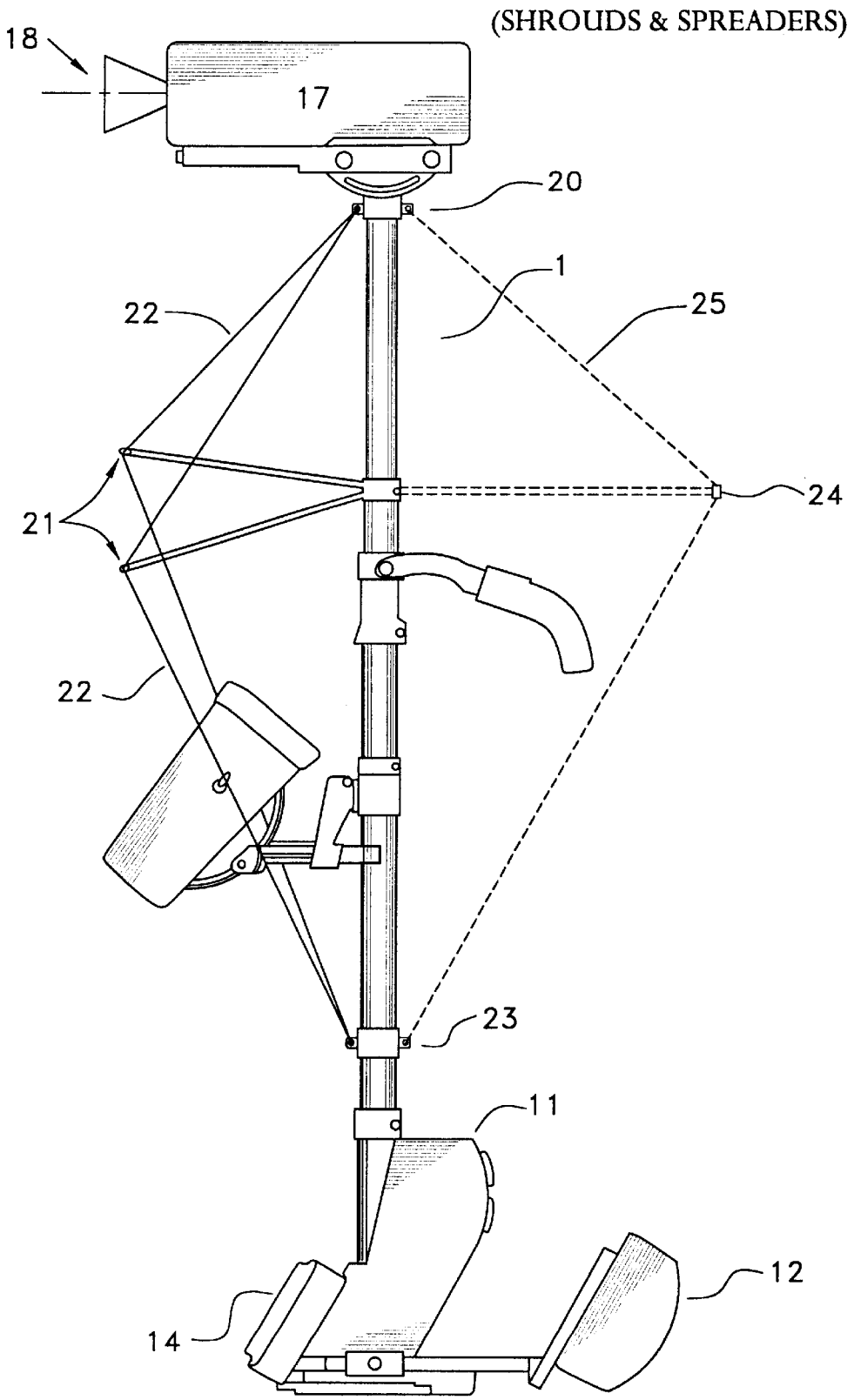
FIG. 3 is an elevational view of an embodiment of the removable "shroud and spreader" means employed to dampen vibration when post is fully extended, comprising:
(a) a plurality of spreaders, removably clamped to approximately the middle of the main section of post;
(b) a plurality of shrouds extending over the spreaders between mounting means located at approximately the top and bottom of the Steadicam®.

FIG. 3 is an elevational view of an embodiment of the removable "shroud and spreader" means employed to increase rigidity and dampen vibration when post assembly 1 is fully extended. It comprises a plurality of spreaders 21, removably clamped to approximately the middle of the main section of the post assembly and a plurality of shrouds 22 extending over the spreaders between removable shroud termination means 20, 23 located at respectively the top and bottom of the post assembly 1.

As the post length of a Steadicam®-type stabilizing system is increased, unless the diameter and wall-thickness of the post assembly 1 is unacceptably increased, it will be subject to torsional whipping caused by the fact that the said assembly is moved and controlled at roughly its center through the gimbal assembly 5, but the effective lever arms out to the masses 17 and 11,14,12 at the extremities have been enormously lengthened. Vibrations induced at the said gimbal will therefore cause angular vibrations of the camera lens axis 18, which would effectively preclude energetic deployment of the system. The present invention provides removable stiffening equipment that can be deployed for typical "long-post" operating, and also, as needed, for normal-post operating involving violent shaking, such as during vehicle shots over rough ground, or high-speed running shots on foot. Depending on the violence of the shot and whether the operator's position remains constant relative to the sled, it is possible to add a third spreader 24 and additional shroud 25 for an additional axis of stiffening. The shrouds of the present invention, permit the use of extremely lightweight carbon fiber post sections. Otherwise, the posts would have to be heavier and perhaps of larger diameter in order to be sufficiently rigid for Steadicam®-type operation.

Figure 4:
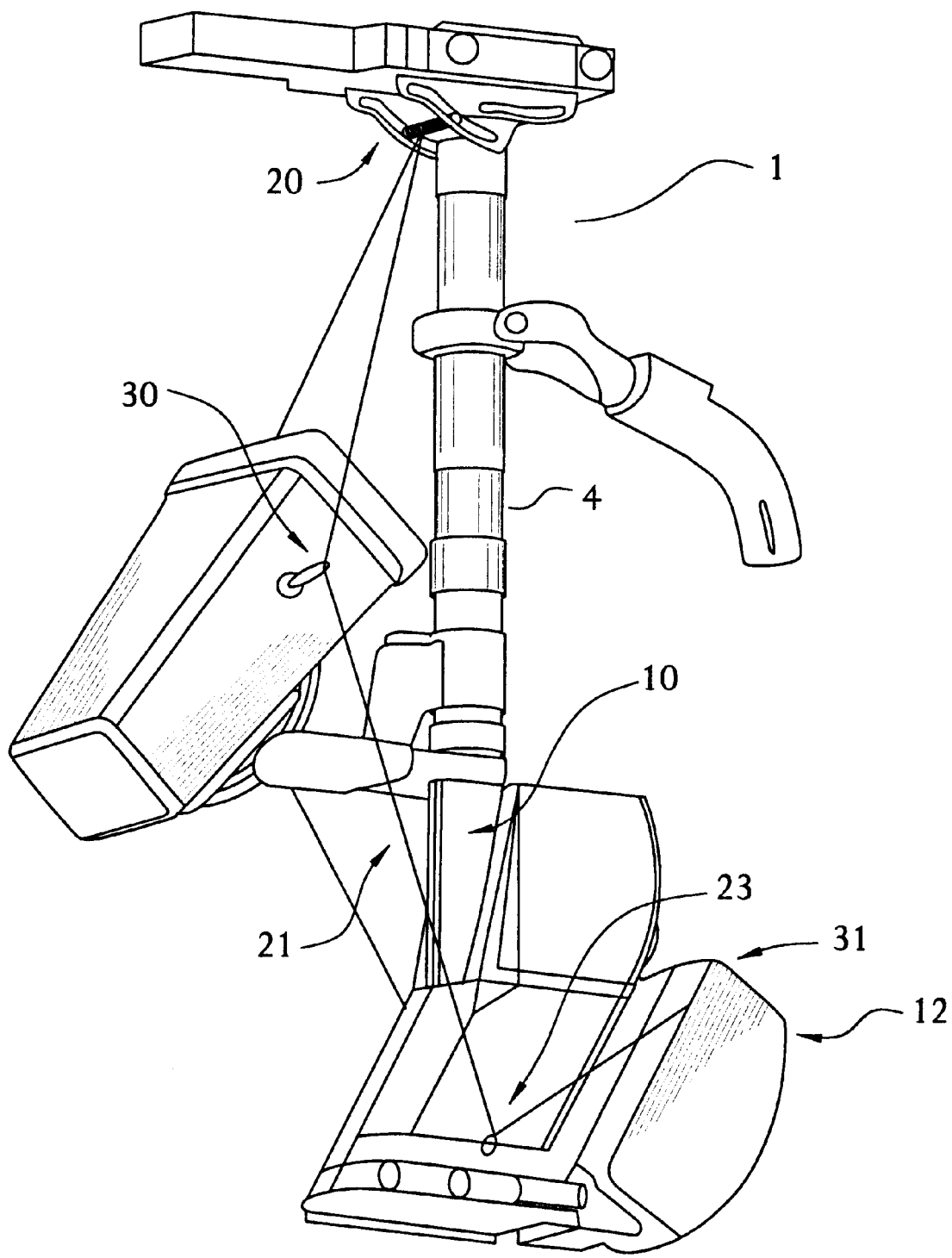
FIG. 4. is a perspective view of a computer rendering of the new Steadicam® of the present invention showing the removable continuous shroud means tensioned using optional standoffs on the sides of the monitor as spreaders, comprising:
(a) attachment points for the path of the continuous shrouds: start and termination points at battery, "hooks" adapted for continuous lacing of non-stretch line at camera, base and monitor
(b) lacing path of the continuous shroud.

FIG. 4 is a perspective view of a computer rendering of the new Steadicam® showing a preferred embodiment of the stiffening equipment, showing removable continuous staying or "shroud" means 21 tensioned and directionally separated using optional standoffs 30 attached to the monitor equipment 8 as spreaders, comprising attachment points 20, 23 for the path of the continuous shrouds.

Dampening of the vibration inherent in energetic "superpost" operation or as experienced during violent vehicle shooting or high-speed running situations (even with normal post lengths) is provided by the deployment of a continuous stay or "shroud" 21 consisting of a tensioned non-stretch line passing over add-on spreaders 30 or other mounting points such as hooks attached to points such as the monitor equipment 8 or battery equipment 12, which points are appropriately displaced from the centerline of the main post 4. The shroud 21 is adapted to function at any post length to stiffen the post uni-directionally along a plurality of approximately perpendicular axes. Spreaders can be attached to the monitor hardware 7 and the shroud can be deployed between attachment means up close to the camera 20 and near the base 23 of the lower post 10. The shroud is deployed over the said spreader means and tensioned, preferably, by extending any one of the telescoping post sections to slightly stress the column of the post, or by pulling tight one end of a single length of non-stretch line (such as Spectra®), which has been continuously threaded bidirectionally. A preferable threading path, for example, might be from a point near the top of the battery 31, down to and under an attachment point at the base of the post system 23, up and over one of the "spreader" points 30 (either extending from the post, or attached to the monitor equipment), and on up and over an attachment point 20 near the camera mount; and then back down via a different spreader point (not shown) which is angularly displaced from the first, to provide another axis of stiffening, and thence continuing down under another attachment at the bottom of the post (not shown), and up to the top of the battery for final tensioning and attachment by conventional means. This will cure the normal magnitude of vibrations. Although this system would seem not to add stiffness against a sudden vibration of the gimbal toward an anterior direction, in usual operation, the centerpost is pre-stressed and slightly bowed in the direction of the spreaders employed, and therefore resists this anterior vibration up to a magnitude that would exceed the degree of this pre-stressing. It is therefore entirely functional for the purpose of stiffening the extended post assembly 1, without interfering with the operators hands and body anterior of the post assembly.

Figure 5:
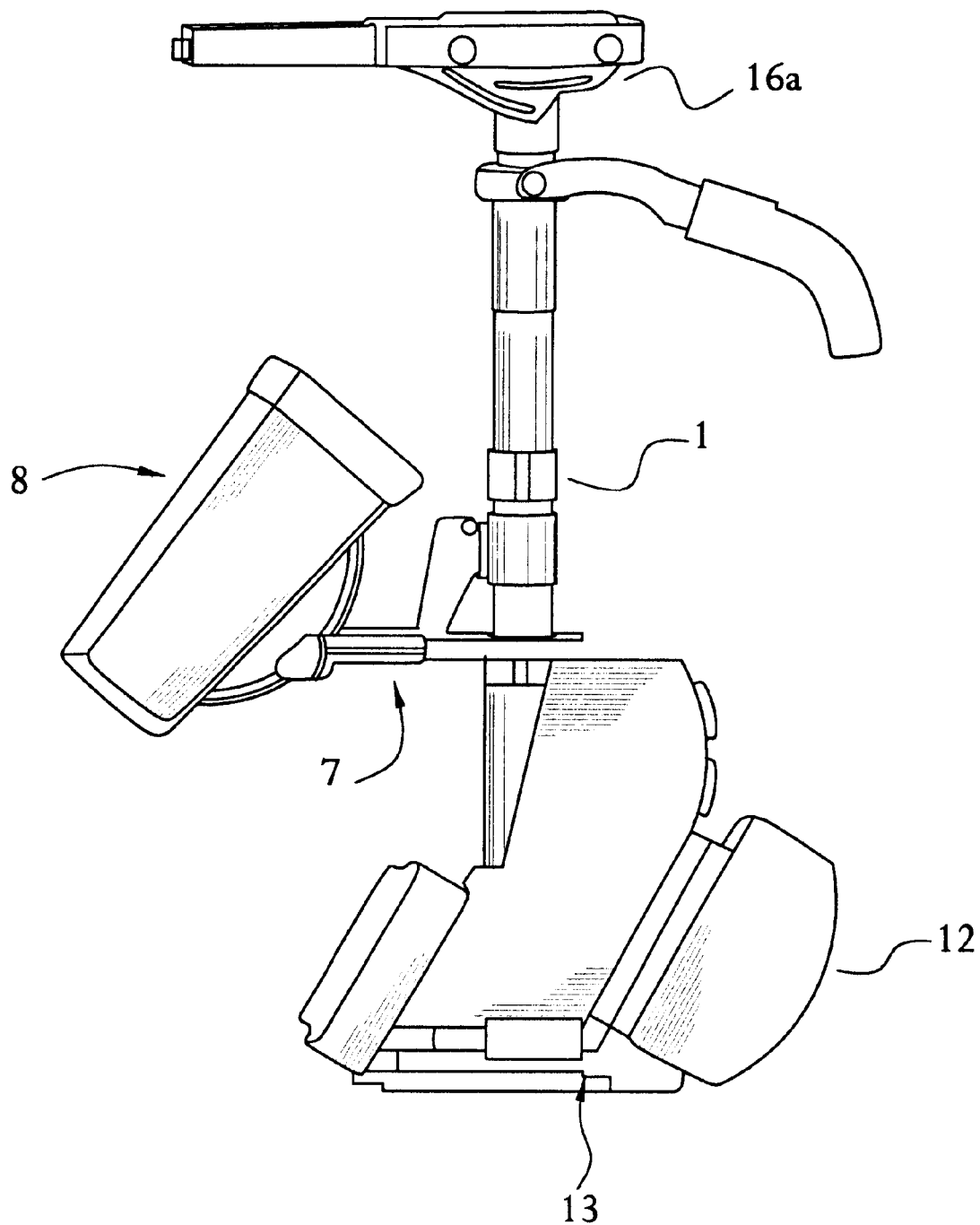
FIG. 5 is a computer rendering of the new Steadicam® showing the relationship between telescoping post, moveable monitor and battery equipment mountings and a novel compact tilt head.

FIG. 5 is a computer rendering of the new Steadicam® in its fully compact mode, showing the relationship between telescoping post assembly 1, moveable monitor 7,8 and battery equipment mountings 12, 13 and a novel compact tilt head 16a.

Figure 6:
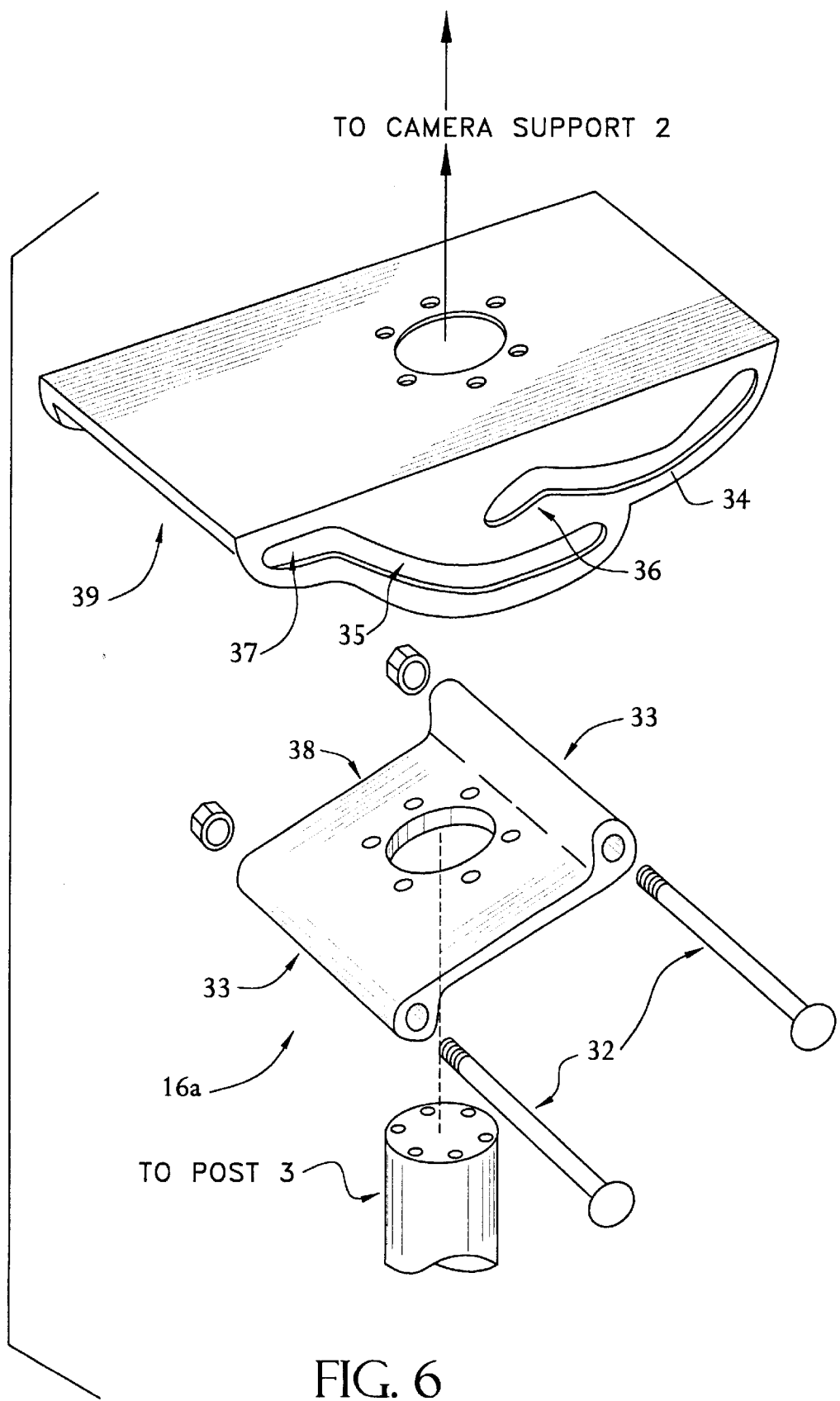
FIG. 6 is a detailed exploded drawing of a novel compact tilt head.

FIG. 6 is a detailed exploded drawing of a preferred embodiment of the novel compact tilt head 16a of the present invention. Preferably, between the camera mounting stage 2 and the adjacent support post 3, a tilting-head is 16a provided to permit changing the tilt attitude of the camera 20 independent of the typically vertical angle of the centerpost 3. In a preferred embodiment, the tilt head 16a is arranged to provide the lowest possible vertical profile and the least obstruction to the hardware at the top of the post consistent with the ability to tilt the camera approximately 20° up and 33° down with reference to the said post axis. Preferably this tilt head comprises sleeves attached to, and flanking a plate 38 bolted to the top of the centerpost 3 with through-bolts 32 to which asymmetrical pairs of arcuate slots 34, 35 can be slidably positioned and clamped--said arcuate slots being cut into a plurality of opposed rigid arcs depending from a plate 39 attached to the camera mount 2. A non-arcuate continuation of the slots 36, 37 permits further tilting in the direction that would otherwise be obstructed by the camera mount because the preferable center of the said arc of tilting is displaced anterior to the centerline of the centerpost.

Figure 7:
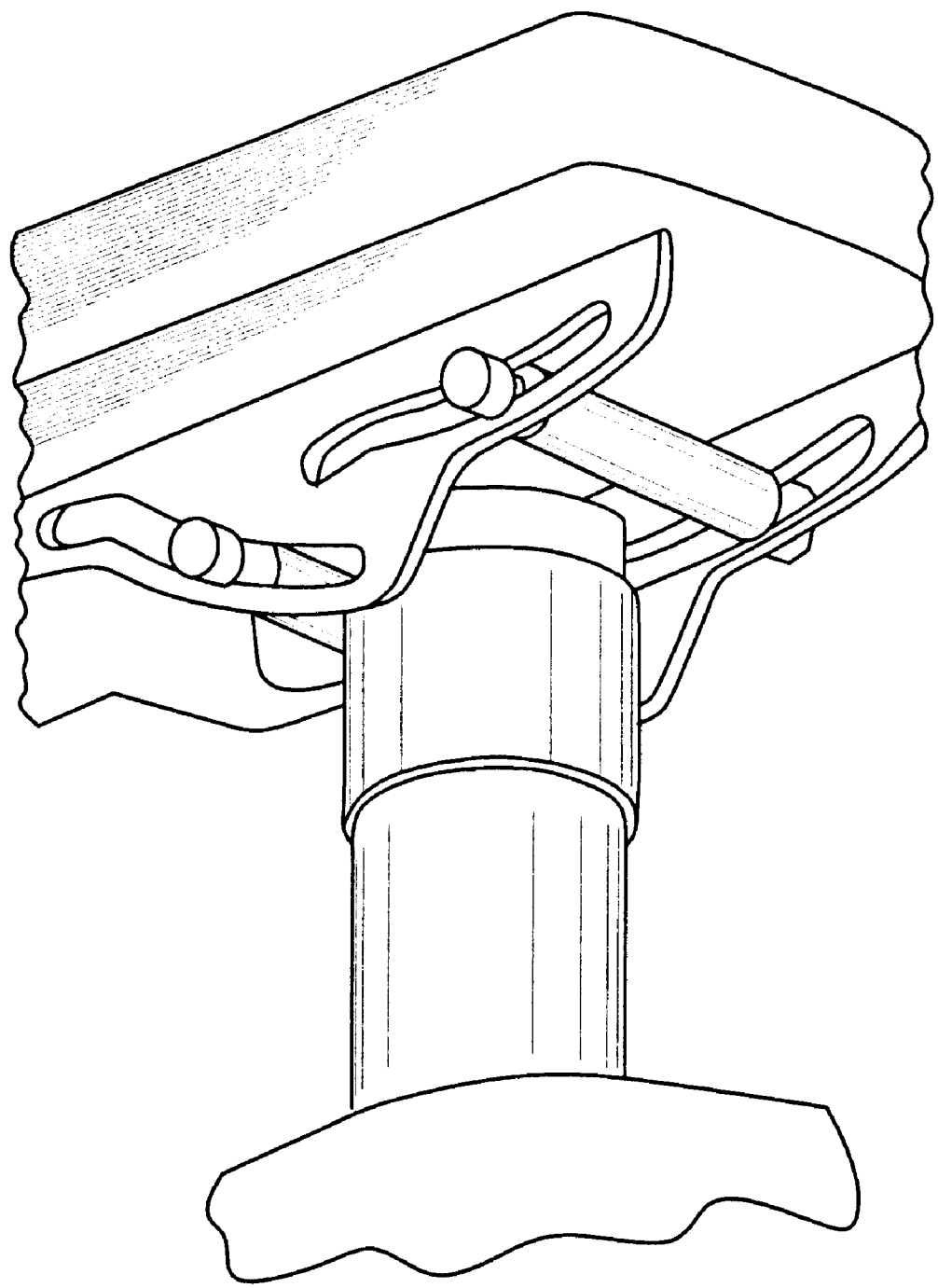
FIG. 7 is a perspective computer rendering illustrating the assembled parts of the novel compact tilt head.

FIG. 7 is a perspective computer rendering illustrating the assembled parts of the novel compact tilt head 16a, including bolts 32, sleeves 33, and semi-arcuate slots 34, 35.

Figure 8:
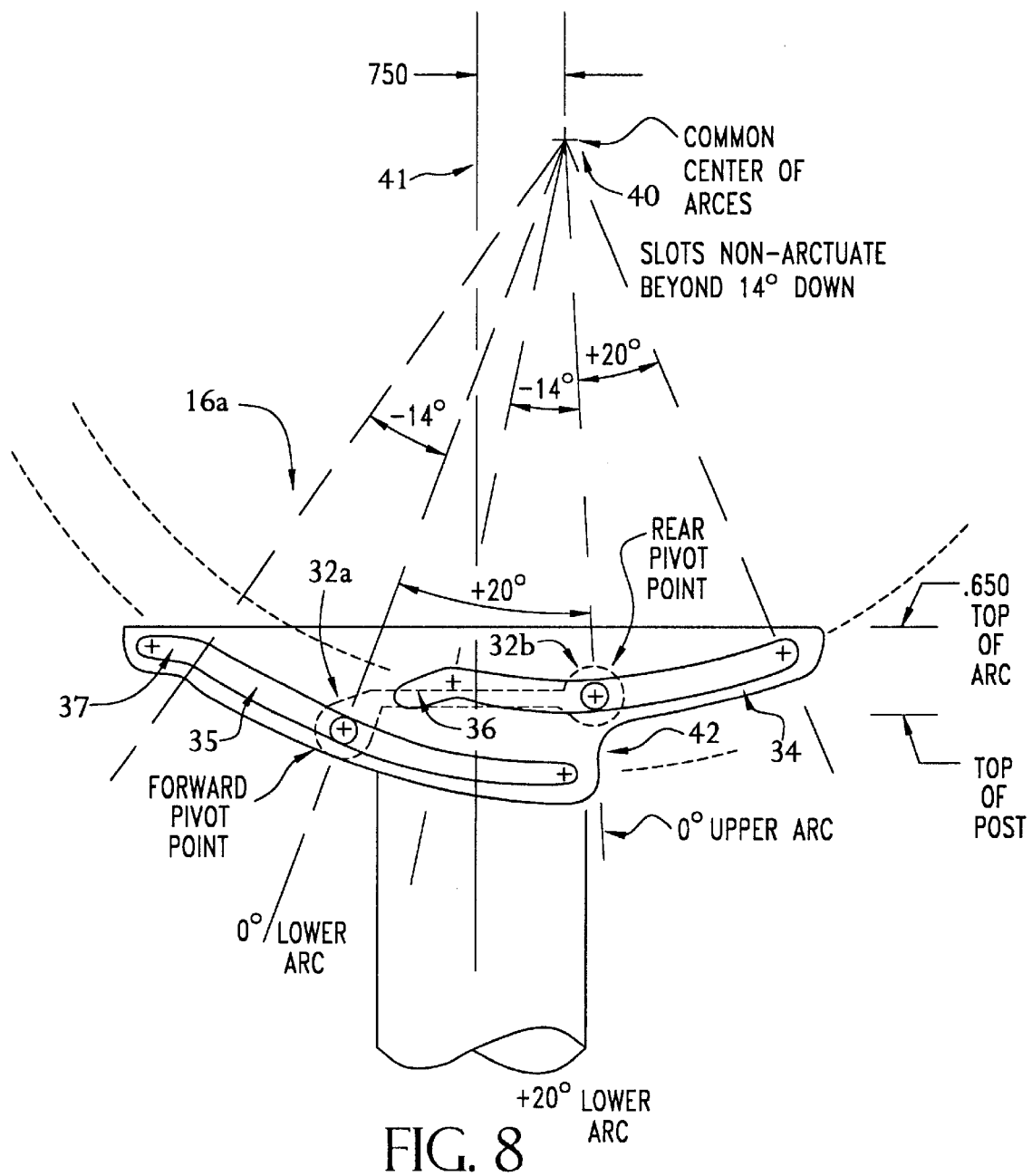
FIG. 8 is a diagrammatic illustration of center of rotation of arcuate slots.

FIG. 8 is a diagrammatic illustration of center of rotation of the arcuate slots 34, 35 of the compact tilting head 16a of the present invention. Preferably the said slots are concentric to a point in space 40 coincident with the mean center of gravity of the range of cameras appropriate to Steadicam® use—which point is typically displaced rearward from the centerline of the mounting post 41 in order to preserve dynamic balance. Preferably, there are two sets of paired laterally symmetrical arcuate slots 34, 35, of differing radii such that each sleeved bolt engages its own pair of slots, with the rearward sleeved bolt 32b engaging the slots of the smallest radius 34, thus providing additional vertical clearance for functioning components associated with the upper anterior surface of the centerpost 42. In addition, preferably, the arcuate slots extend a short distance at the forward end in a non-arcuate direction, adapted to allow continued tilting as will be illustrated in FIG. 8

Figure 9:
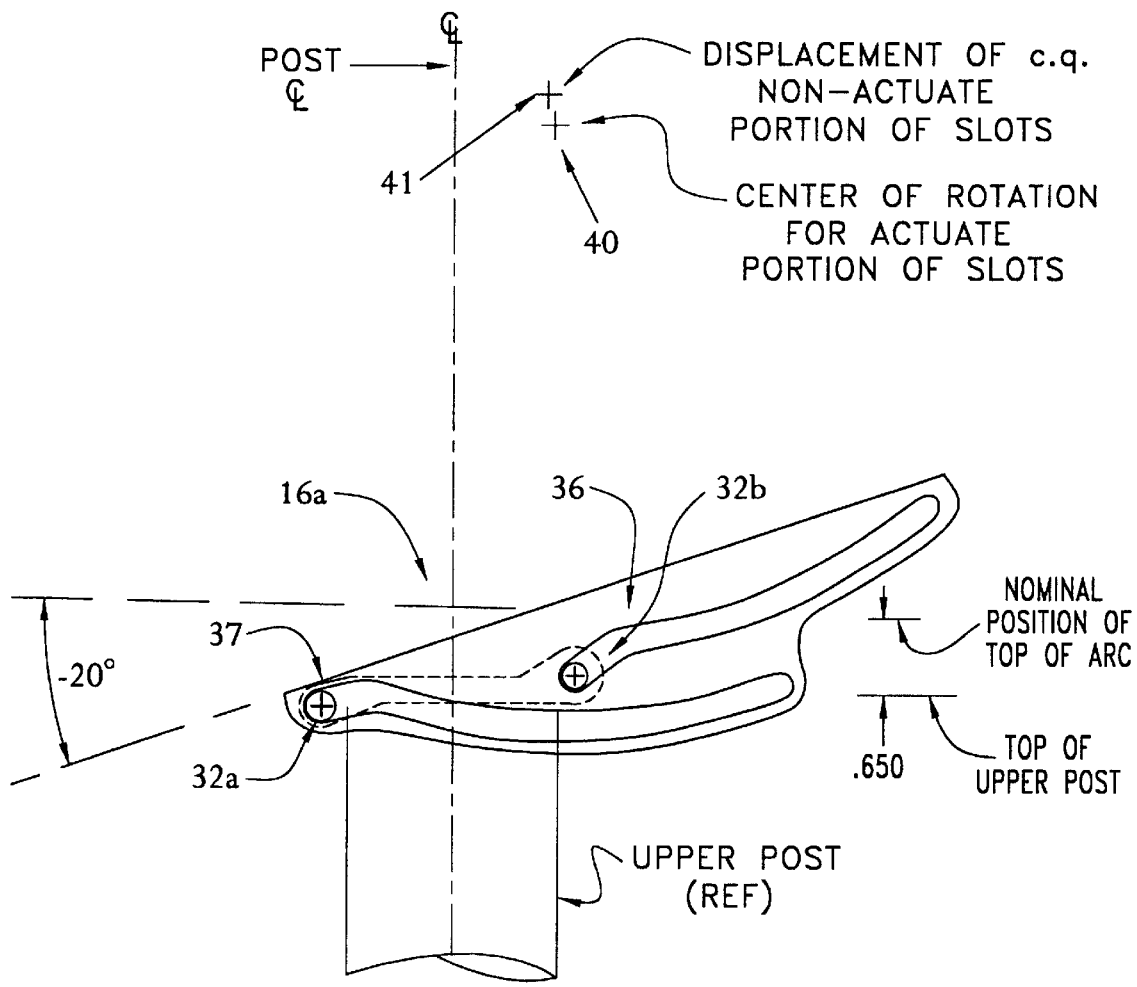
FIG. 9 is a diagrammatic illustration of the displacement of camera's c.g. when the compact tilting head engages non-arcuate portions of slots.

FIG. 9 is a diagrammatic illustration of the displacement of camera's c.g. when the clamping bolts 32a, 32b of the compact tilting head of the present invention engage non-arcuate portions of slots 34, 35. The non-arcuate portions 36, 37 of the slots 34, 35 act on the forward extremity of the camera's tilt (from 14° to 20° in this example), to increase the effective radius of the said slots and cause a small vertical shift of the center of rotation up to point 41. This preserves the rough lateral position of the mean camera c.g. (the center of rotation 40) and eliminates extreme rebalancing of the camera support 2 (not shown), while at the same time permitting additional tilt in a direction which would otherwise be more readily obstructed because the said preferable center of tilt rotation is to the rear of the centerline of the centerpost.

Figure 10:
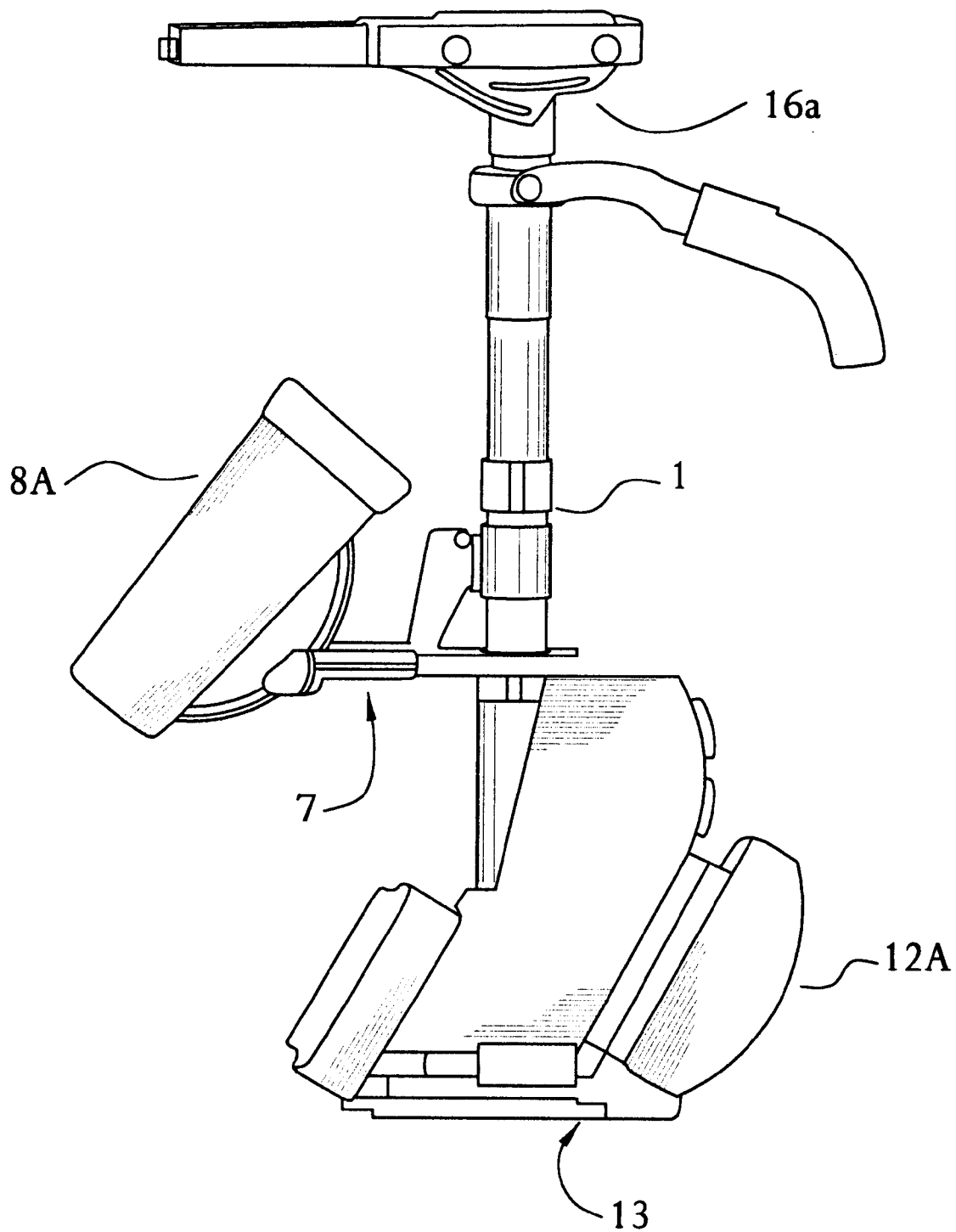
FIG. 10 is a computer rendering of the new Steadicam® in a "running" rig mode showing the relationship between the telescoping posts, a lighter monitor and lighter battery, with a novel tilt head.

FIG. 10 shows a preferred embodiment of the present invention from a perspective view in a "running" rig mode showing the relationship between the telescoping posts and the lighter monitor 8a and battery 12a with a novel tilt head. The "running" rig mode, comprises a lightweight battery and a lightweight monitor mounted on the Steadicam®. In this embodiment, the lighter weight components result in net decrease to the weight of sled and enable an operator to more easily run with and move the sled. The monitor and battery mountings remains adapted to be positioned at varying perpendicular distances from the post so the structure is adaptable to be balanced statically and dynamically with varying lighter weight equipment. Similarly, the position of the lighter battery and monitor is adjustable to provide control over the magnitude of rotational insertion of the sled in the pan axis.

FIG. 11 diagrams the method of fabricating the ultralight retracting device for preventing fouling of the internal electrical wires 3 when the telescoping posts (not shown) are fully shortened. Step 1. shows a slightly pre-stretched elastic cord, such as a surgical rubber cord I attached at either end of a cylindrical mandril 2. Step 2 shows the spiral wrapping of a bundle of loose electrical wires 3 along the mandril 2, and crossing the surgical rubber 1.

Figure 12A:
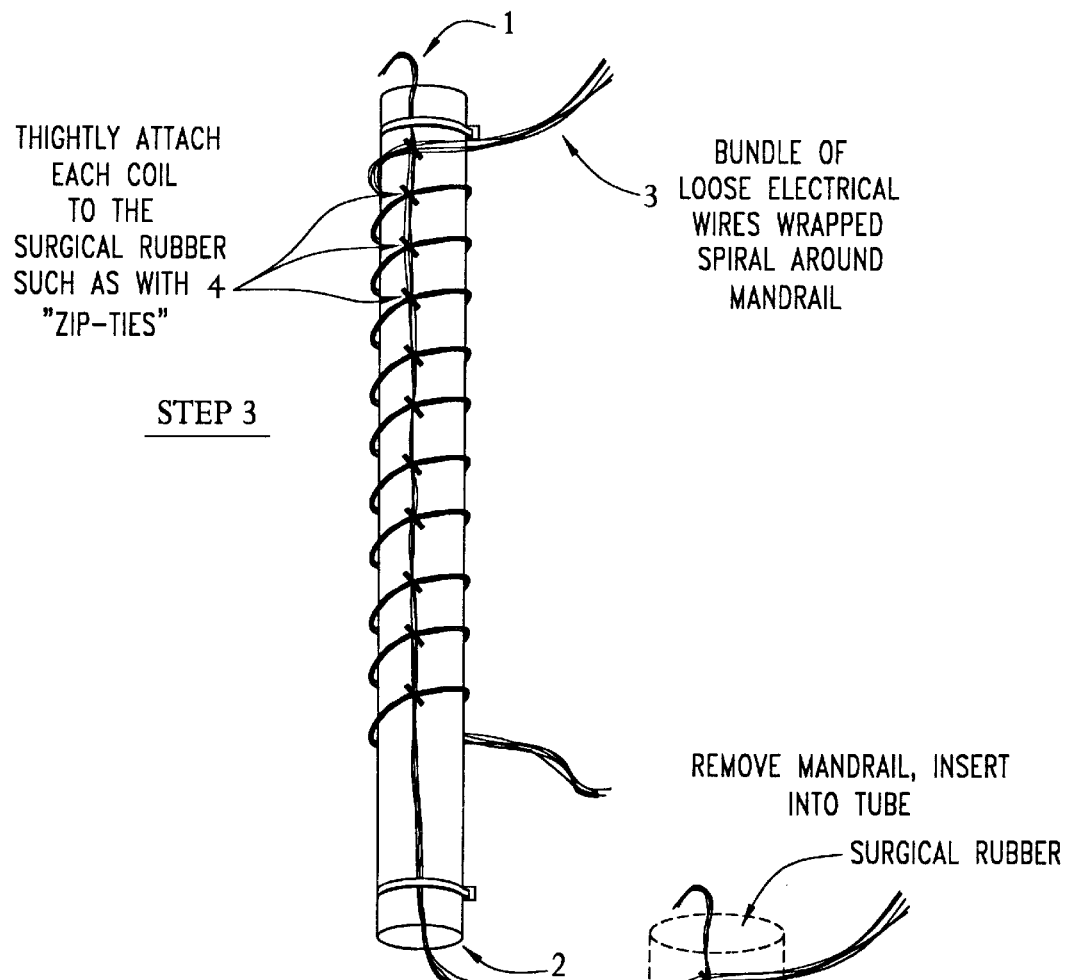
FIG. 12 is a diagram of steps three and four, showing the completion of the above fabrication and the resulting ultralight curlycord device.
Figure 12B:
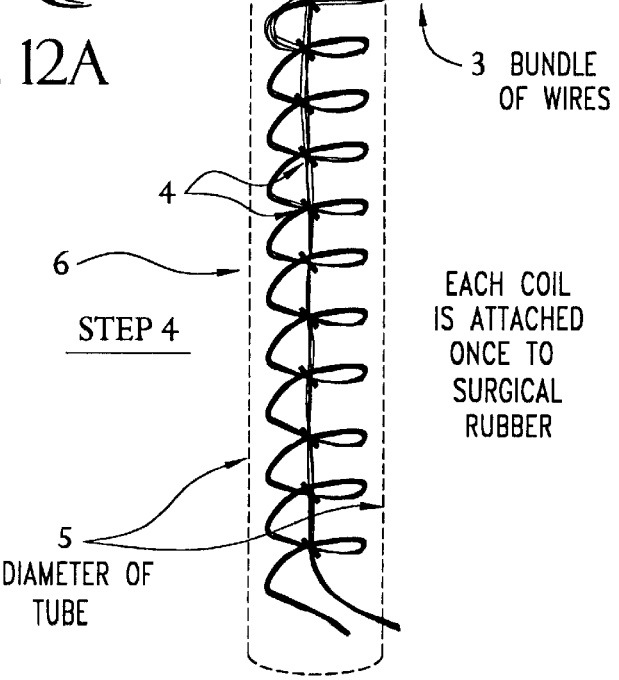

FIG. 12 shows Step 3 and step 4 of the method of fabricating the ultralight curlycord device 6. In Step 3, the spiral coil of wires 3 is attached, once each turn, by means of ties 4 at each point where the wires cross the surgical rubber cord 1. In Step 4, the mandril 2 is removed and the coil is inserted in the smallest section of telescoping post (indicated by dotted lines 5. This ultralight curlycord device 6 provides more powerful retracting ability than traditional heavy curlycords, without the heavy weight of the traditional plastic jackets, heat-treated to retain "memory".

It will be further understood that various changes in the details, materials, and arrangements of the parts which have been described and illustrated in order to explain the nature of this invention may be made by those skilled in the art without departing from the principle and scope of the invention as expressed in the following claims.

I claim:

1. A portably extendable and retractable telescoping stabilizing support system for receiving and dynamically balancing a plurality of elements during use, the support system comprising:

an elongated main support member, having a distal end adapted to adjustably receive and removably secure a primary support system, a proximal end adapted to adjustably receive and removably secure the main support member to a secondary support system, and a gimbal means adjustably positioned at the stabilizing support system's center of gravity wherein;

the primary support system is telescopically extendable and retractable from within the main support member, having a distal end and a proximal end, comprising at least one telescoping primary support member slidably movable to a predetermined distance from within the main support member between the retracted position and the extended position, and an element support means removably secured on the distal end of the primary support member furthest remote from the main support member to adjustably receive and removably secure an element in a predetermined position;

the secondary support system, having a distal end and a proximal end, comprising a base support member, at least one telescoping secondary support member within which the main support member is telescopically extendable and retractable, said secondary support member being extendable and retractable from within the base support member, a base at the secondary support system's proximal end removably secured to the base support member and comprising a means for movably and fixedly positioning a plurality of elements, wherein each element is adjustably and removably securable thereto and wherein at least one element is adjustably moveable along either the main support system or the secondary support system, for counterbalancing and maintaining dynamic balance of the support system; and an adjustably and removably securable viewing element;

whereby rotational inertia of the stabilizing support system can be increased in a pan axis as the adjustably secured elements are oriented in relation to the telescopically extendable and retractable support members to maintain the support system balance.

2. The stabilizing support system of claim 1 wherein the primary support system comprises a plurality of telescoping primary support members wherein each member's diameter decreases in relation to a member's distance from the main support member.

3. The stabilizing support system of claim 2, wherein the telescoping primary support members are adapted to sequentially slide into each other, such that each successive member is slidably moveable into the next largest member.

4. The stabilizing support system of claim 2 wherein a proximal end of the telescoping primary member nearest the main support member is extendable and retractable from within the distal end of the main support member.

5. The stabilizing support system of claim 1, wherein the element positioned on the element support means is an adjustable and removably securable camera.

6. The stabilizing support system of claim 5, wherein the element support means is an angularly adjustable and pivotally tiltable camera support means.

7. The stabilizing support system of claim 1, wherein one of said plurality of elements of the secondary support system is an adjustable and removably securable viewing means.

8. The stabilizing support system of claim 7, wherein the viewing means is an adjustable and removably securable monitor.

9. The stabilizing support system of claim 1, wherein one of said plurality of elements of the secondary support system is an adjustable and removably securable mass.

10. The stabilizing support system of claim 9, wherein the mass is an adjustable and removably securable battery.

11. The stabilizing support system of claim 1, wherein the base support member is an annular cylinder adjustable to receive a proximal end of the secondary support member.

12. The stabilizing support system of claim 11, wherein the cylinder has an open longitudinal section to allow access for adjustment, insertion and removal of the secondary support member into the cylinder.

13. The support system of claim 1 in combination with an integral variably-adjustable camera support apparatus adjustably secured to the distal end of the primary support member for the fixedly angular maneuvering and securing of an adjustable and removably secured camera, having a center of rotation at a point that is congruent to the center of gravity of a camera element, that is supported on a support plate, and is distanced from a vertical-centerline of the primary support member, whereby an approximate dynamic balance is maintained during operation of the apparatus and the camera, said apparatus comprising an inner plate having an inner connection means for receiving and removably securing the inner plate to the distal end of the primary support member, an inner mounting means for removably securing the inner plate to a support plate, the support plate having a plate connection means for receiving and removably securing the support plate to the distal end of the primary support member, a plate receiving means for receiving and removably securing the inner plate, a camera element receiving means for adaptably receiving and removably securing the camera element, an adjustably releaseable and removably securable tilting means comprising a plurality of sets of paired laterally symmetrical openings for selectively tilting and adjustably positioning the support plate and removably secured camera element to a predetermined position, wherein an opening comprises a slot or other angular registration positioning means for enabling adjustment an adjustable apparatus securing means for adjustably securing the apparatus in a predetermined angular position in relation to the distal end of the primary support member;

whereby the combination permits an operator to change a tilt altitude of an element removably secured on the apparatus independent of the support system's vertical angle allowing for balancing of cooperating elements of the support system and reducing support system element physical interferences and clearance problems.

14. The stabilizing support system of claim 13, wherein tilting of the apparatus along non-arcuate portions of the openings adjusts an element's center of gravity vertically and maintains the element's lateral positioning wherein the element is removably secured onto the apparatus and the additional tilt, in a direction typically prevented by an element support means, is achieved without altering the support system's center of rotation or balance.

15. The stabilizing support system of claim 13 wherein the element is a camera.

16. An integral variably-adjustable camera support apparatus adaptable to be adjustably secured to a distal end of a primary support member for the fixedly angular maneuvering and securing of an adjustable and removably secured camera, having a center of rotation at a point that is congruent to the center of gravity of an element, that is supported on a support plate, and is distanced from a vertical-centerline of the primary support member, whereby an approximate dynamic balance is maintained during operation of the apparatus and the camera, comprising an inner plate having an inner connection means for receiving and removably securing the inner plate to the distal end of the primary support member, an inner mounting means for removably securing the inner plate to a support plate, the support plate having a plate connection means for receiving and removably securing the support plate to the distal end of the primary support member, a plate receiving means for receiving and removably securing the inner plate, a camera element receiving means for adaptably receiving and removably securing the camera element, an adjustably releaseable and removably securable tilting means comprising a plurality of sets of paired laterally symmetrical openings for selectively tilting and adjustably positioning the support plate and removably secured camera element to a predetermined position, wherein an opening comprises a slot or other angular registration positioning means for enabling adjustment an adjustable apparatus securing means for adjustably securing the apparatus in a predetermined angular position in relation to the distal end of the primary support member.

17. The apparatus of claim 16 wherein the primary support member extends from a mobile camera support system.

18. The apparatus of claim 16 wherein the sets of paired openings are configured to allow for adjusting and sliding the apparatus to any position along the opening to adjust the angular movement of the apparatus.

19. The apparatus of claim 16, wherein each opening is at least partly-arcuate.

20. The apparatus of claim 19 wherein each opening is a set of paired openings has a differing radii wherein the radii are concentric to a point in space coincident with a center of gravity of an element removably secured on the apparatus for providing additional vertical clearance.

21. The apparatus of claim 19, wherein each opening permits a vertical shift in the center of gravity of the element removably secured on the support plate while maintaining the element's lateral position.

22. A portable camera support system comprising:
a plurality of nesting, telescopic, elongated posts;
wherein said plurality of posts comprises:
a base post within which each successive post can nest when retracted, and to which a plurality of elements are attached, at least one of which is radially and laterally adjustably securable to the base post for counterbalancing and maintaining dynamic balance of the camera support system, and within which each successive post can nest when retracted;
a viewing element support post which is longer and more narrow than said base post for telescopic retraction therein and supports a viewing element which is longitudinally, radially, and laterally adjustably securable to the viewing element support post;
a gimbal support post which is longer and more narrow than said viewing element post for telescopic retraction therein, and supporting a longitudinally and radially adjustable gimbal means, wherein said gimbal means is adjusted and secured at the center of gravity for the camera support system; and
a camera support post which is longer and more narrow than said gimbal support post, which is adapted at the end opposite said gimbal support post for adjustably mounting a camera element;
wherein each successive post is independently, selectively and telescopically extendable and retractable anywhere from a fully retracted position to a fully extended position.

23. The camera support system of claim 22 further comprising one or more telescopic posts defining a primary support system between said camera support post and said gimbal support post, wherein the camera support post has the smallest diameter and the gimbal support post is the largest and those between are sized for telescopic extension or retraction within said gimbal support post.

24. The camera support system of claim 22 further comprising one or more telescopic posts defining a secondary support system between said gimbal support post and base post, wherein the gimbal support post has the smallest diameter and the base post has the largest diameter and those between are sized for telescopic extension or retraction within said base post.

25. The camera support system of claim 22, further comprises a tiltable camera mount comprising:
a plate member affixed to the camera mounting post at said end opposite sad gimbal mounting post; wherein said plate defines two parallel, hollow sleeves which flank said plate and are perpendicular to the camera direction;
a camera support plate to which a camera element is removably securable, wherein said support plate defines a plurality of opposed, mated pairs of rigid arcuate slots;
wherein said support plate is adjustably secured to said plate member via a bolt for each mated pair and corresponding hollow sleeve; wherein each said bolt passes through a first of the mated, opposed arcuate slots, through one of said hollow sleeves, and through the other of said mated, opposed arcuate slots;
such that tilt angle is established by selectively rotating said support plate along said arcuate slots.

26. The camera support system of claim 25, wherein an end of each said arcuate slot is extended, in the shooting direction of the camera, into a non-arcuate portion for facilitating further downward tilt by displacing the center of tilt toward said shooting direction.

27. The camera support system of claim 22 further comprising a stiffening and stabilizing system which comprises:
shroud means;
spreader means displaced laterally from the centerline of said support system posts, for accepting and routing said shroud means;
wherein said shroud means is removably secured at the camera mounting end of said support system and at the base of said support system, and routed through said spreader means therebetween;
said shroud being affixed under tension to provide stress to said support system thereby resisting vibration.

28. The camera support system of claim 27, wherein an additional spreader means is angularly displaced from said spreader means with respect to said centerline of said support system; and additional shroud means secured under tension through said additional spreader means.

29. The camera support system of claim 28, wherein said shroud means and said additional shroud means are provided as a continuous length which passes, under tension, from a secured location at the base of said support system, through said spreader means, through attachment means at the camera mounting end of said support system, through said additional spreader means, and finally to a secured location at the base of said support system.

30. The camera support system of claim 22, further comprising an internally retracting electrical wire housed within said posts of said support system for connecting the various elements, wherein said wire defines a plurality of coils, wherein each of said coils is attached to an elongated elastic member such that said wire is extendable from a relaxed, compressed condition to a stretched length corresponding at least to the maximum extended length of the entire system.

31. The camera support system of claim 30, wherein a plurality of electrical wires are bundled and affixed to said elastic member for unitary extension and retraction.

32. A portable camera support system comprising:
   a. a central support system comprising a plurality of nesting, telescopic, elongated posts; wherein said plurality of posts comprises:
      1) a base post within which each successive post can nest when retracted and to which a plurality of elements at least one of which is longitudinally, radially, and laterally adjustably securable to the base post for counterbalancing and maintaining dynamic balance of the camera support system;
      2) a viewing element support post which is longer and more narrow than said base post for telescopic retraction therein and supports a viewing element which is longitudinally, radially, and laterally adjustably securable to the viewing element support post;
      3) a gimbal support post which is longer and more narrow than said viewing element post for telescopic retraction therein, and supporting a longitudinally and radially adjustable gimbal means, wherein said gimbal means is adjusted and secured at the center of gravity for the system; and
      4) a camera support post which is longer and more narrow than said gimbal support post, which is adapted at the end opposite said gimbal support post for adjustably mounting a camera element;
   wherein each successive post is independently, selectively and telescopically extendable and retractable anywhere from a fully retracted position to a fully extended position;
   b. a tiltable camera mount comprising:
      1) a plate member affixed to the camera mounting post at said end opposite sad gimbal support post; wherein said plate defines two parallel, hollow sleeves which flank said plate and are perpendicular to the camera direction;
      2) a camera support plate to which a camera element is removably securable, wherein said support plate defines a plurality of opposed, mated pairs of rigid arcuate slots;
      wherein said support plate is adjustably secured to said plate member via a bolt for each mated pair of arcuate slots and corresponding hollow sleeve; wherein each said bolt passes through a first of the mated, opposed arcuate slots, through one of said hollow sleeves, and through the other of said mated, opposed arcuate slots;
      such that tilt angle is established by selectively rotating said support plate along said arcuate slots;
   c. a stiffening and stabilizing system which comprises:
      1) shroud means;
      2) spreader means displaced laterally from the centerline of said support system posts, for accepting and routing said shroud means;
      wherein said shroud means is removably secured at the camera mounting end of said camera support system and at the base of said camera support system, and routed through said spreader means therebetween;
      said shroud being affixed under tension to provide stress to said support system thereby resisting vibration; and
   d. an internally retracting electrical wire housed within said posts of said camera support system for operatively connecting the various elements, wherein said wire defines a plurality of coils, wherein each of said coils is attached to an elongated elastic member such that said wire is extendable from a relaxed, compressed condition to a stretched length corresponding at least to the maximum extended length of the entire system.

33. A stabilizing support system for receiving and dynamically balancing a plurality of elements during use, the support system comprising:
   an elongated main support member, having a distal end adapted to adjustably receive and removably secure a primary support system, a proximal end adapted to adjustably receive and removably secure the main support member to a secondary support system, and a gimbal means adjustably positioned at the stabilizing support system's center of gravity wherein;
   the primary support system is telescopically extendable and retractable from within the main support member, having a distal end and a proximal end, comprising at least one telescoping primary support member slidably moveable to a predetermined distance from within the main support member between a retracted position and a extended position, and an element support means removably secured on the distal end of the primary support member furthest remote from the main support member to adjustably receive and removably secure an element in a predetermined position;
   the secondary support system, having a distal end and a proximal end, comprising at least one telescoping secondary support member associated with the main support member for telescopic extension and retraction therewith; and having a base at the secondary support system's proximal end removably secured for movably and fixedly positioning a plurality of elements, wherein each element is adjustably and removably securable thereto and wherein at least one element is adjustably moveable along at least one of the main support system and the secondary support system, for counterbalancing and maintaining dynamic balance of the support system; and
   whereby rotational inertia of the stabilizing support system can be increased in a pan axis as the adjustably secured elements are oriented in relation to the telescopically extendable and retractable support members to maintain the support system balance.

34. The stabilizing support system of claim 33 wherein the primary support system comprises a plurality of telescoping primary support members wherein each member's diameter decreases in relation to a member's distance from the main support member.

35. The stabilizing support system of claim 34, wherein the telescoping primary support members are adapted to sequentially slide int each other, such that each successive member is slidably moveable into the largest member.

36. The stabilizing support system of claim 34 wherein a proximal end of the telescoping primary member nearest the main support member is extendable and retratable from within the distal end of the main support member.

37. The stabilizing support system of claim 33, wherein the element positioned on the element support means is an adjustable and removably securable camera.

38. The stabilizing support system of claim 37, wherein the element support means is an angularly adjustable and pivotally tiltable camera support means.

39. The stabilizing support system of claim 33, wherein one of said plurality of elements of the secondary support system is an adjustable and removably securable viewing means.

40. The stabilizing support system of claim 39, wherein one of said plurality of elements of the secondary support system is an adjustable and removably securable mass.

41. The stabilizing support system of claim 33, wherein one of said plurality of elements of the secondary support system is an adjustable and removably securable mass.

42. The stabilizing support system of claim 41, wherein the mass is an adjustable and removably securable battery.

43. The stabilizing support system of claim 33, wherein the base support member is an annular cylinder adjustable to receive a proximal end of the secondary support member.

44. The stabilizing support system of claim 43, wherein the cylinder has an open longitudinal section to allow access for adjustment, insertion and removable of the secondary support member into the cylinder.

45. The support of claim 33 in combination with an integral variably-adjustable camera support apparatus adjustably secured to the distal end of the primary support member for the fixedly angular maneuvering and securing of an adjustable and removably secured camera, having a center of rotation at a point that is congruent to the center of gravity of a camera element, that is support on a support plate, and is distanced from a vertical-centerline of the primary support member, whereby an approximate dynamic balance is maintained during operation of the apparatus and the camera, said apparatus conprising an inner plate having an inner connection means for receiving and removably securing the inner plate to the distal end of the primary support member, an inner mounting means for removably securing the inner plate to a support plate, the support plate having a plate connection means for receiving and removably securing the support plate to the distal end of the primary support member, a plate receiving means for receiving and removably securing the inner plate, a camera element receiving means for adaptably receiving and removably securing the camera element, an adjustably releaseable and removably securable tilting means comprising a plurality of sets of paired laterally symmetrical openings for selectively tilting and adjustably positioning the support plate and removably secured camera element to a predetermined position, wherein an opening comprises a slot or other angular registration positioning means for enabling adjustment an adjustable apparatus securing means for adjustably securing the apparatus in a predetermined angular position in relation to the distal end of the primary support member;

whereby the combination permits an operator to change a tilt altitude of an element removably secured on the apparatus independent of the support system's vertical angle allowing for balancing of cooperating elements of the support system and reducing support system element physical interferences and clearance problems.

46. The stabilizing support system of claim 45, wherein tilting of the apparatus along non-arcuate portions of the openings adjusts an element's center of gravity vertically and maintains the element's lateral positioning wherein the element is removably secured onto the apparatus and the additional tilt, in a direction typically prevented by an element support means, is achieved without altering the support system's center of rotation or balance.

47. The stabilizing support system of claim 45 wherein the element is a camera.

48. A portable camera support system comprising:

a plurality of nesting, telescopic, elongated posts;

wherein said plurality of posts comprises:

a main support post supporting a longitudinally and radially adjustable gimbal means, wherein said gimbal means is adjusted and secured at the center of gravity for the camera support system;

a primary support post which is telescopically extendable and retractable within said main support post, and is adapted at the end opposite said main support post for adjustably mounting a camera element;

a secondary support post associated at one end thereof for telescopic extension and retraction with said main support post, and having a plurality of attached elements, at least one of which is radially and laterally adjustable securable for counterbalancing and maintaining dynamic balance of the camera support system;

wherein a viewing element which is longitudinally, radially, and laterally adjustably securable to the secondary support post; and each post is independently, selectively and telescopically extendable and retractable anywhere from a fully retracted position to a fully extended position with respect to adjacent posts.

49. The camera support system of claim 48 wherein each of said primary and secondary support posts is capable of telescopic extension and retraction within said main support post.

50. The camera support system of claim 48 further comprises one or more telescopic posts defining a primary support system between said primary support post and said main support post, wherein the primary support post has the smallest diameter and the main support post has the largest and those between are sized for telescopic extension or retraction within said main support post.

51. The camera support system of claim 48 further comprising one or more telescopic posts defining a secondary support system between said main support post and secondary support post, wherein the main support post has the largest diameter and the secondary support post has the smallest diameter and those between are sized for telescopic extension or retraction within said main support post.

52. The camera support system of claim 48, further comprises a tiltable camera mount comprising:

a plate member affixed to the camera mounting post at said end opposite sad gimbal mounting post; wherein said plate defines two parallel, hollow sleeves which flank said plate and are perpendicular to the camera direction;

a camera support plate to which a camera element is removably securable, wherein said support plate defines a plurality of opposed, mated pairs of rigid arcuate slots;

wherein said support plate is adjustably secured to said plate member via a bolt for each mated pair and corresponding hollow sleeve; wherein each said bolt passes through a first of the mated, opposed arcuate slots, through one of said hollow sleeves, and through the other of said mated, opposed arcuate slots;

such that tilt angle is established by selectively rotating said support plate along said arcuate slots.

53. The camera support system of claim 52, wherein an end of each said arcuate slot is extended, in the shooting direction of the camera, into a non-arcuate portion for facilitating further downward tilt by displacing the center of tilt toward said shooting direction.

54. The camera support system of claim 48 further comprising a stiffening and stabilizing system which comprises:

shroud means;
   spreader means displaced laterally from the centerline of said support system posts, for accepting and routing said shroud means;
   wherein said shroud means is removably secured at the camera mounting end of said support system and at the base of said support system, and routed through said spreader means therebetween;
   said shroud being affixed under tension to provide stress to said support system thereby resisting vibration.

55. The camera support system of claim 54, wherein an additional spreader means is angularly displaced from said spreader means with respect to said centerline of said support system; and additional shroud means secured under tension through said additional spreader means.

56. The camera support system of claim 55, wherein said shroud means and said additional shroud means are provided as a continuous length which passes, under tension, from a secured location at the base of said support system, through said spreader means, through attachment means at the camera mounting end of said support system, through said additional spreader means, and finally to a secured location at the base of said support system.

57. The camera support system of claim 48, further comprising an internally retracting electrical wire housed within said posts of said support system for connecting the various elements, wherein said wire defines a plurality of coils, wherein each of said coils is attached to an elongated elastic member such that said wire extendable from a relaxed, compressed condition to a stretched length corresponding at least to the maximum extended length of the entire system.

58. The camera support system of claim 57, wherein a plurality of electrical wires are bundled and affixed to said elastic member for unitary extension and retraction.

59. A portable camera support system comprising:

a plurality of nesting, telescopic, elongated posts;
   wherein said plurality of posts comprises:
   a gimbal support post supporting a longitudinally and radially adjustable gimbal means, wherein said gimbal means is adjusted and secured at the center of gravity for the camera support system;
   a camera support post which is telescopically extendable and retractable within said gimbal support post, and is adapted at the end opposite said gimbal support post for adjustably mounting a camera element;
   a viewing element support post, associated at one end thereof for telescopic extension and retraction with said gimbal support post, for supporting a viewing element which is longitudinally, radially, and laterally adjustably securable to the viewing element support post; and
   a base post, to which plurality of elements are attached, at least one of which is longitudinaly, radially, and laterally adjustably securable for counterbalancing and maintaining dynamic balance of the camera support system, and being telescopically associated, at one end, with said viewing element support post;
   wherein each successive post is independently, selectively and telescopically extendable and retractable anywhere from a fully retracted position to a fully extended position with respect to adjacent posts.

b. a tiltable camera mount comprising:
   1) a plate member affixed to the camera mounting post at said end opposite sad gimbal support post; wherein said plate defines two parallel, hollow sleeves which flank said plate and are perpendicular to the camera direction;
   2) a camera support plate to which a camera element is removably securable, wherein said support plate defines a plurality of opposed, mated pairs of rigid arcuate slots;
   wherein said support plate is adjustably secured to said plate member via a bolt for each mated pair of arcuate slots and corresponding hollow sleeve; wherein each said bolt passed through a first of the mated, opposed arcuate slots, through one of said hollow sleeves, and through the other of said mated, opposed arcuate slots;
   such that tilt angle is established by selectively rotating said support plate along said arcuate slots;

c. a stiffening and stabilizing system which comprises:
   1) shroud means;
   2) spreader means displaced laterally from the centerline of said support system post, for accepting and routing said shroud means;
   wherein said shroud means is removably secured at the camera mounting end of said camera support system and at the base of said camera support system, and routed through said spreader means therebetween;
   said shroud being affixed under tension to provide stress to said support system thereby resisting vibration; and d. an internally retracting electrical wire housed within said posts of said camera support system for operatively connecting the various elements, wherein said wire defines a plurality of coils, wherein each of said coils is attached to an elongated elastic member such that said wire is extendable from relaxed, compressed condition to a stretched length corresponding at least to the maximum extended length of the entire system.

60. A stabilizing support system comprising:

a main support post to which a gimbal is attached at the center of gravity for the stabilizing support system, said main support having a proximal end and a distal end;
   a primary support system which is telescopically extendable and retractable within said distal end of main support post;
   a secondary support system which is telescopically associated with the proximal end of main support post for extension and retraction therefrom;
   wherein a plurality of elements are adjustably securable to each of said primary support system and said secondary support system, for increasing rotational inertia in a pan axis to maintain stabilizing support system balance.

* * * * *

UNITED STATES PATENT AND TRADEMARK OFFICE
CERTIFICATE OF CORRECTION

PATENT NO. : 6,293,676 B1
DATED : September 25, 2001
INVENTOR(S) : Garrett W. Brown and Jerry Holway It is certified that error appears in the above-identified patent and that said Letters Patent is hereby corrected as shown below:

<u>Title page,</u>
Item [75], Inventors, please add the inventor:
-- Garrett W. Brown, Philadelphia, PA (US) --.

Signed and Sealed this

Thirteenth Day of September, 2005

JON W. DUDAS
*Director of the United States Patent and Trademark Office*